(No Model.)
C. PERKES.
LIQUID SEAL TRAP.
No. 578,024.
Patented Mar. 2, 1897.
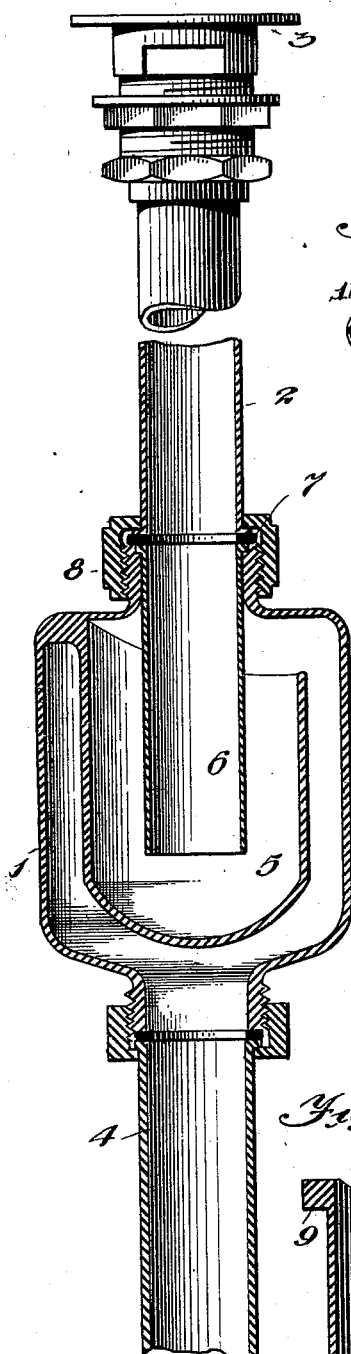
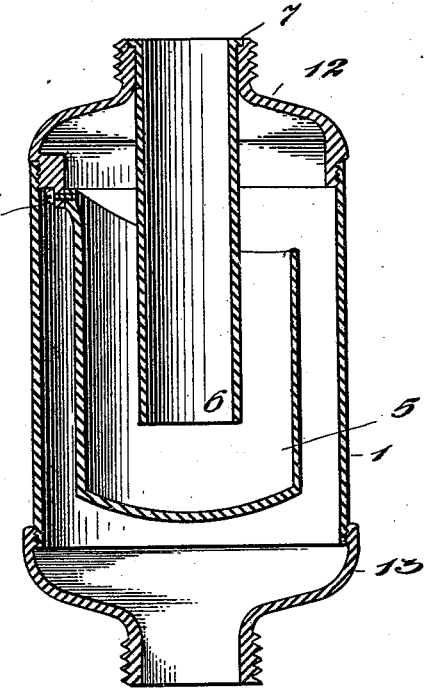
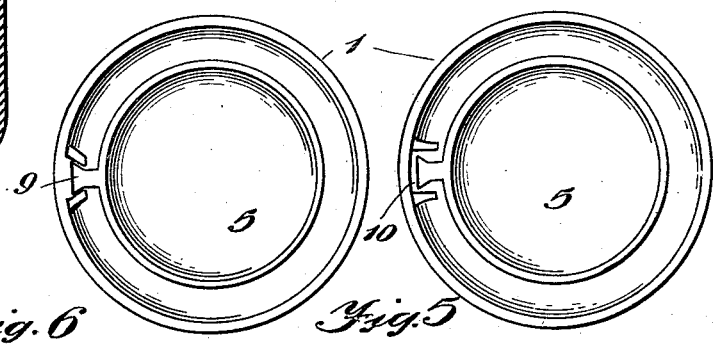
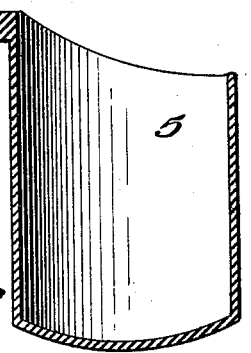
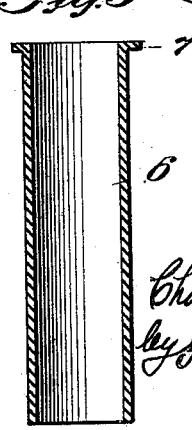
Witnesses
Inventor
Chas. Perkes
Attorney
THE NORRIS PETERS CO., PHOTO-LITHO., WASHINGTON, D. C.

UNITED STATES PATENT OFFICE.

CHARLES PERKES, OF PHILADELPHIA, PENNSYLVANIA.

LIQUID-SEAL TRAP.

SPECIFICATION forming part of Letters Patent No. 578,024, dated March 2, 1897.

Application filed December 24, 1896. Serial No. 616,889. (No model.)

*To all whom it may concern:*

Be it known that I, CHARLES PERKES, a citizen of the United States, residing at Philadelphia, in the county of Philadelphia and State of Pennsylvania, have invented certain new and useful Improvements in Liquid-Seal Traps; and I do declare the following to be a full, clear, and exact description of the invention, such as will enable others skilled in the art to which it appertains to make and use the same, reference being had to the figures of reference marked on the accompanying drawings, which form a part of this specification.

Figure 1 represents a central vertical section of a liquid-seal trap and connections to which I have applied my invention. Fig. 2 represents a central vertical section of a modified form of my improved liquid-seal trap. Figs. 3 and 4 represent horizontal sections of the form of trap shown in Fig. 1, which illustrates one of my methods of rigidly securing the seal-cup within the main body of the trap. Fig. 5 represents a detail view of the seal-tube, and Fig. 6 a similar view of the seal-cup.

My invention relates more particularly to a straight-line liquid-seal trap in which is secured and preserved an uninterrupted and unrestricted flow of liquid through the trap, at the same time maintaining its efficiency as a seal, whereby any possibility of hair, lint, and other extraneous matter is effectually prevented from clogging and being caught in the trap.

In the drawings, 1 represents the main body of the trap, which may be cast or formed in one piece, as shown in Fig. 1, or which may be formed in two or more pieces, as shown in Fig. 2.

2 represents the pipe connection at the top, 
secured to the trap 1 by any suitable means and leading to a basin 3 or other vessel, the discharge from which it is desired to seal.

4 represents the pipe at the base of the trap and leading therefrom to any suitable point of discharge, as a sewer. The connection of this pipe 4 with the trap may be secured by any suitable joint.

5 is a seal-cup disposed, preferably, concentric within the trap 1 and supported to the side or roof of the main body of the trap. The peculiarity of this seal-cup consists in the fact that there is presented an annular surface of large area for the overflow from the seal, which surface is entirely free from any tendency to become clogged by extraneous matter discharged through the trap. This result is secured by curving or beveling the upper edge of the seal from its point of attachment to the main body of the trap downwardly to a greater of less extent, so that the lowest portion of the upper edge is substantially opposite the point of attachment to the body of the trap. This is clearly shown in Figs. 1 and 2.

6 is the seal-tube, supported at its upper end preferably by a flange 7, resting on a ledge or seat in the upper portion of the trap 1, whereby when the trap is disconnected from the inlet-pipe 2 the seal-tube 6 may be easily and readily removed and replaced for the purpose of cleansing or for repairs.

As a preferred construction I insert a washer or packing above the flange of the seal-tube between it and the flange of the inlet-pipe 2, so that when the collar 8 is screwed down thereon a perfect fluid-pipe joint is maintained.

In Figs. 1, 3, and 4 the seal-cup 5 is shown cast with the main body 1. To secure this result, the seal-cup 5 is cast first and separately and is provided with a lug 9, projecting outwardly at one side at the point where it is to be attached to the trap 1. This seal-cup is then inserted within the core, which forms the annular space between the seal-cup and the inner wall of the trap 1, the lug, projecting outside of the core, as shown, into a hollow space formed in the main core at 10, Fig. 4. This space is sufficiently large to admit the lug 9 and permit the metal in casting to flow around the lug. By this process the body 1 and seal-cup 5 are cast solid, the lug 9 fusing in the act of casting.

In Fig. 2 the seal-cup 5 is secured to the upper portion of the trap 1 by means of a mechanical connection, such as a screw bolt or bolts 11. In this instance the top of the trap 1 is formed separately in a cap 12, by means of which this construction is rendered possible. The other features of this modification are substantially the same. This modification shows also a separate bottom cap 13. By this construction the trap may be made of any special length outside of standard sizes, and it will be seen that any special length may be given to the trap where for any reason it might be desirable.

It will be seen that by the use of my invention the water cannot rise high enough over the rim of the seal-cup to reach the connection of the cup to the main body of the trap and thereby clog the same, but, on the contrary, the liquid must flow away freely at a point opposite to the connection of the cup to the trap and at a point lower than said connection. The area of the seal-cup discharge is double that of the seal-tube, and the area of the main body of the trap is double that of the seal-cup, so that it is impossible for the water under any circumstances to rise to the level of the connection between the seal-cup and the trap 1.

My invention may be applied to other than straight-line traps.

Having now fully described my invention, what I claim is—

1. In a liquid-seal trap, the combination of a main body, a seal-cup disposed therein having a point of attachment to the upper portion of said main body and tapering downwardly from both sides of said point of attachment to the opposite side of the seal-cup, and a seal-tube within the seal-cup.

2. The combination with the main trap-body having an inlet-opening for liquid and an outlet-opening at opposite ends, and in line with each other, a seal-cup concentrically located within the trap-body, and a seal-tube loosely seated within said inlet-opening, and projecting concentrically within the seal-cup, whereby the seal-tube may be readily removed from the seal-cup and main trap-body for cleaning or repairing the trap-body.

In testimony whereof I affix my signature in the presence of two witnesses.

CHARLES PERKES.

Witnesses:
LOUIS F. SCHUCK,
ALBERT C. ROBERTS, Jr.